Aug. 16, 1955
F. SCHULTE
2,715,528
FLY-WEIGHT GOVERNOR WITH ELECTRO-MAGNETIC CONTROL
OPERATIVE DIRECTLY ON THE FLY-WEIGHT
Filed June 3, 1953
2 Sheets-Sheet 1
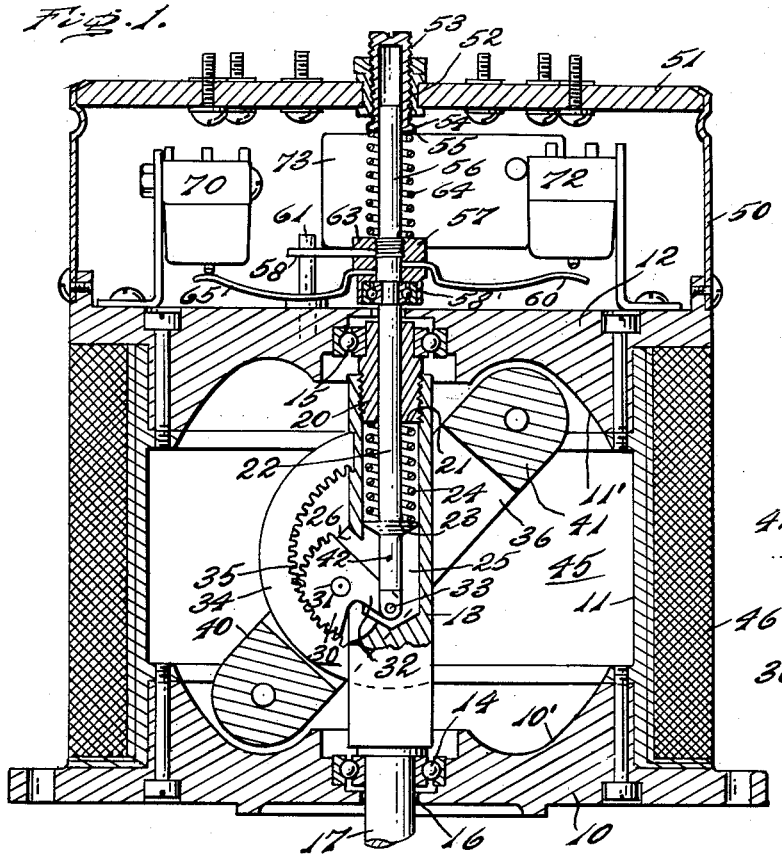
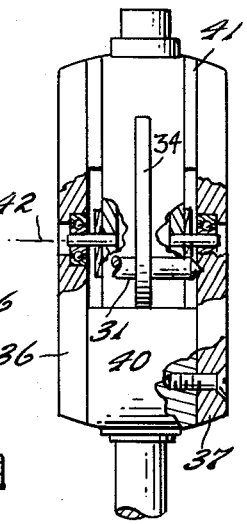
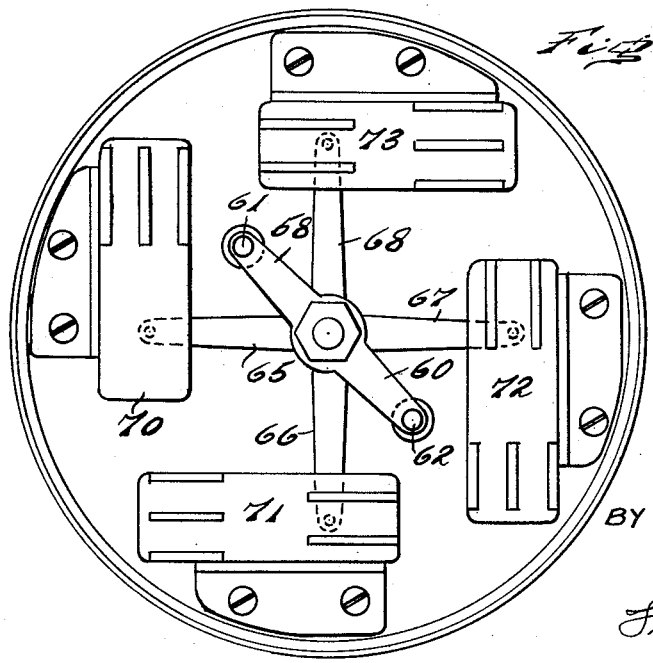
INVENTOR:
FRITZ SCHULTE,
DECEASED;
BY WESLEY H. CALDWELL,
ADMINISTRATOR.
BY
Frank H. Borden
ATTORNEY.

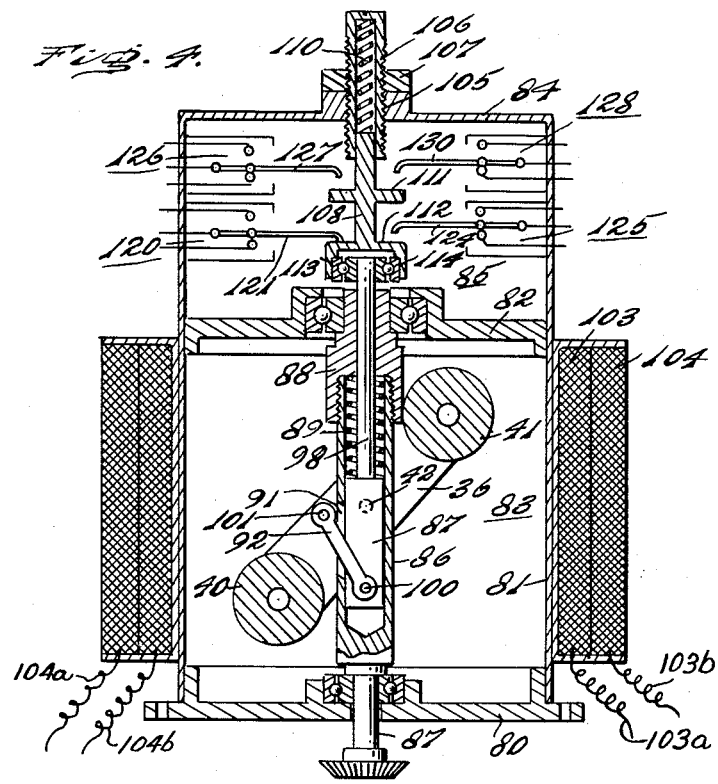
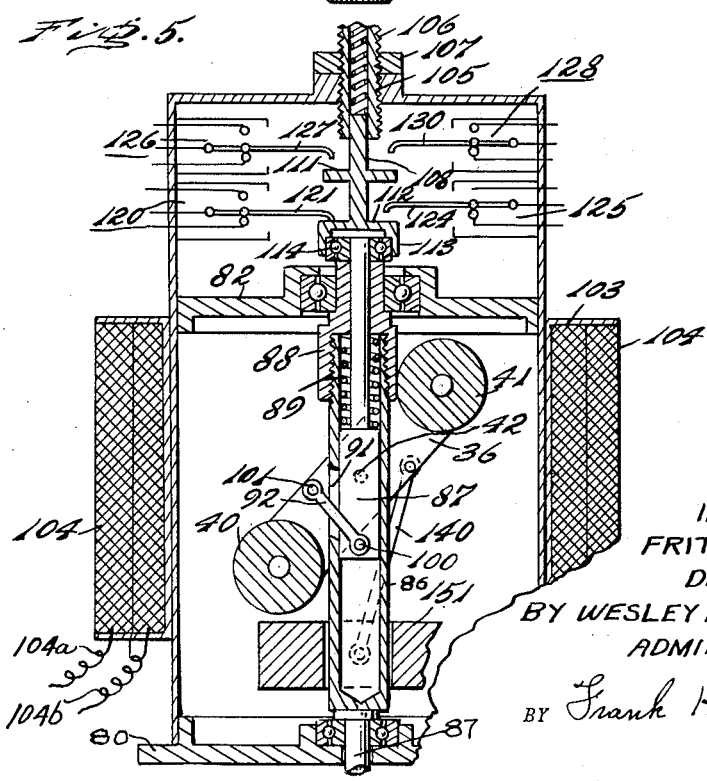

United States Patent Office 2,715,528
Patented Aug. 16, 1955

2,715,528

FLY-WEIGHT GOVERNOR WITH ELECTRO-MAGNETIC CONTROL OPERATIVE DIRECTLY ON THE FLY-WEIGHT

Fritz Schulte, Philadelphia, Pa.; Wesley H. Caldwell, administrator of said Fritz Schulte, deceased, assignor to Thomas D. Bowes, Bala-Cynwyd, Pa.

Application June 3, 1953, Serial No. 359,317

8 Claims. (Cl. 264—8)

This invention relates to governors, and particularly to speed-responsive governors in which the indication or control effect normally developed in response to a predetermined speed of the governor actuating shaft, and the corresponding fly-weight attitude to which the indication or control is proportional, can be predeterminedly varied by a control voltage electro-magnetically operative directly on the fly-weights.

It is among the objects of the invention to improve the art of governors; to provide a governor device in which the fly weights and arms are of magnetic material, the path of rotation of which is peripherally surrounded by a coil, whereby a signal voltage passing through the coil exerts a solenoid effect on the fly weights to predeterminedly change the attitude of the fly weights and therefore of the speeder rod functionally with change in the voltage passing through the coil; to provide a governor with electro-magnetic control means by which a predetermined change can be effected in the instantaneous attitude of the fly weights selectively additive or subtractive to the attitude normally attained as a response to a given instantaneous rotative speed of the fly weights; to provide a governor with electro-magnetic control means for changing the position of the speeder rod from that developed in response to a given rotational speed of the fly weights without energization of the electro-magnetic control means, without any increase in the friction in the organization; and to provide other objects and improvements as will appear as the description proceeds.

In the accompanying drawings forming part of this description:

Fig. 1 represents a vertical section through an illustrative form of governor according to the invention, having an energizable coil for securing the solenoid type of controlled response from the fly weight organization, and showing a plurality of micro-switches as an illustration of control elements actuated by the speeder rod, with means for effecting zonal variations in control.

Fig. 2 represents a fragmentary side elevation of the rotatable parts of the governor of Fig. 1.

Fig. 3 represents a top plan of the device of Fig. 1, with the upper cover plate removed, to show the illustrative controlled switch organization.

Fig. 4 represents a similar vertical section through a modified form of the invention typified by Fig. 1.

Fig. 5 represents a similar vertical section through a modified form of the invention of Fig. 4, in which the governor is rendered immune to shocks or impacts axial of the governor organization by reason of an illustrative counterweight.

In carrying out the invention in an illustrative embodiment, the fly weights are mounted on opposite ends of parallel centrally pivoted arms in a novel organization, as compared with the conventional bell crank ball arm organizations of the prior art, and mounted by the pivot on a rotatable shaft, with means for elevating and lowering the speeder rod against the force of the speeder rod spring functionally with the attitude of the fly-weight organization, as is conventional. The fly weights and connecting arms are of magnetic material, while, in the basic form at least, all other movable parts are of non-magnetic material. The path of rotation of the fly-weight organization is surrounded by a coil and the fly-weight organization of magnetic material is in the field created by the passage of current through the coil. Passage of current through the coil establishes flux lines generally axial of the coil and polarizes the ends of the coil. This also polarizes the fly-weight organization and by attraction between the poles of the organization and of the coil exerts a force tending to align the fly-weight organization with the axis of the coil. As the force is manifested at the ends of the fly-weight organization and it is balanced on opposite sides of the pivot it imposes substantially no added friction on the governor. In operation, with no current in the coil, with rotation of the rotative shaft at a given speed, the fly-weight organization assumes an attitude functional with such given speed, and the speeder rod is proportionally positioned and exerts whatever indication or control is associated with that speeder rod position. When voltage is impressed on the coil the electro-magnetically created force mentioned is effective on the fly-weight organization to urge same toward axial alignment with the coil without affecting its rotative speed, and with the only observable effect the movement of the speeder rod to comport with the new attitude of the fly-weight organization. When the fly-weight organization is of material which is not polarized before current flow in the coil, but is polarized thereby, the action following the closing of the circuit through the coil, in its effect on the speeder rod, may be designated as a negative control effecting a depressing action. It will be understood that when it is desired to effect selectively either a negative control with a depressing action on the speeder rod, or a positive control with an elevating action on the speeder rod, the fly weight organization can be constituted as a permanent magnet, in which the respective fly-weights and arms are permanently magnetized as a unit, like a bar magnet, with the opposite ends respectively comprising the opposite poles thereof. It will be seen that with the fly-weight organization permanently polarized, the instant polarization of the coil from current flow and the consequent attraction or repulsion of the pole nearest the given end of the coil, will depend upon the polarity of the current flowing through the coil. It is preferred to use D. C. voltage for control purposes but A. C. may equally well be used, preferably so provided that its frequency is higher than that which causes vibration of the rotating masses of the governor. As will be pointed out, and as will be understood, many changes and modifications may be made in the invention without departing from the basic and important principles thereof, as will be at least partially pointed out thereinafter.

In the illustrative type of governor shown in Fig. 1 a base plate 10 is provided, mounting a sleeve 11. A complemental plate 12 is mounted on the sleeve 11. Plates 10 and 12 are illustratively of magnetic material, such as soft iron and the confronting faces thereof are shaped to form curved or contoured surfaces, respectively 10' and 11'. These magnetic end plates are for the purpose of effecting zone control in the sense that adjacent to the plates there is a zone of enhanced or maximum electro-magnetic effects, progressively diminishing in electro-magnetic effects axially of the coil through other zones toward the center in which there is a zone of minimum electro-magnetic effects. Energization of the coil while the fly-weight organization is in the attitude responding to slow speeds, will therefore exert greater force on the fly-weight organization, than at higher speeds, due to the location of the poles of the fly-weight organization in the zone of greatest electro-magnetic effects with the slow speed of rotation. This therefore enables differential responses of the fly-weight organization to the same circuit flow through the coil, according to the instant speed of the rotative shaft. If desired, end plates 10 and 12 may be of non-magnetic material and may be planar.

A hollow shaft 13 is journalled in plate 10, as at 14, and in plate 12, as at 15. Plate 10 is apertured as at 16 to permit a reduced shank portion 17 of the hollow shaft 13 to project downwardly below the plate 10 for driven relation to a source of rotational movement (not shown) so that the shaft 17, 13, is driven rotationally at various speeds according to variations in the speed of the rotational input. The upper end of the hollow shaft 13 is threaded to a bushing element 20 engaging the bearing 15, and forming an internal shoulder 21. A speeder rod 22 is slidable in the bushing 20 and hollow shaft 13, and has a shoulder 23 for engagement by the speeder spring 24 at its lower end, and the spring has engagement at its upper end against the shoulder 21. The speeder spring 24 surrounds the speeder rod 22 in the hollow chamber or space 25 within the hollow shaft 13. An axially longitudinal slot 26 is formed through the wall of hollow shaft 13, to communication with the inner chamber 25.

A fly weight or fly ball organization is provided, comprising parallel spaced ball arms respectively 36 and 37, joined at their free ends by the fly weights, respectively 40 and 41. The ball arms 36 and 37 straddle the hollow shaft 13, and are pivoted thereto in their symmetrical centers on an axis 42 intersecting the axis of the hollow shaft 13.

The upper and lower plates 12 and 10 and the sleeve 11 define a ball chamber 45 within which the fly weights and coupled ball arms can rotate and can also move about the pivot 42.

A segmental gear bell crank lever 30 having a segmental gear portion 35 and an arm 32 is mounted on trunnions 31 journalled in the opposite cheeks or ball arms 36 and 37, radially spaced from the ball arm main pivot 42, in front of the axial slot 26. The lever arm 32 of the bell crank 30 extends inwardly through the slot 26 in the hollow shaft 13, and is pivoted at 33 to the lower end of the speeder rod intersecting the axis of shaft 13. A segmental arcuate internally toothed rack 34 is mounted rigidly on the shaft 13 in a diametrical plane thereof passing through said slot 26, having an axis of generation coincident with the main axis 42 of the ball arm and fly weight organization. The axis of the speeder rod 22 passes through the pivot 33. It will be seen that the axis 31 of the segmental gear bell crank lever 30 moves with the fly weight assembly in an arc about the main axis 42. As the fly weights 40 and 41 move outwardly under centrifugal force and the axis of trunnions 31 moves arcuately, the segmental gear portion 35 of the bell crank, in mesh with the internal teeth of the rack 34, turns on pivot 31, and elevates the free inner end of the arm so that the pivot 33 with the speeder rod moves linearly axially of the hollow shaft 13 and the speeder rod elevation is a function of the displacement of the fly weights from their static rest positions.

The sleeve 11, and complemental portions of the plates 10 and 12 mounts a coil, or plurality of coils, 46, surrounding the ball or fly weight chamber 45. Means (not shown) are provided for energizing the coil or coils with varying potential. It is important that of all the movable elements so far described, the only magnetic material used in the rotating portions is in the fly weights 40 and 41 and their connecting arms 36 and 37, and everything else, preferably, at least to the degree that it could have an adverse effect on the desired solenoid action, to be described, is of non-magnetic material. As noted of this particular form of the invention, the plates 10 and 12 are of magnetic material and are also in and are affected by the field of coil or coils 46. As also noted, if desired, the organization of arms 36 and 37 and fly weights 40 and 41 may comprise a permanent magnet, the ends of which are of opposite polarity.

To translate the speeder rod motion into useful signals, the upper plate 12 mounts a housing 50 having an end closure member 51 in which electrical terminal members for the governor may be mounted, and having an axial aperture 52 in which an adjustable rod guide member 53 is mounted, having a portion 54 having a downwardly presenting shoulder 55. A non-rotating speeder rod extension 56 is provided, having at the lower end an enlargement 57 for a bearing 58', engaged by the upper end of the speeder rod 22. The enlargement 57 preferably mounts a pair of diametrically disposed guide arms 58 and 60, the outer free ends of which are apertured to be slidable on vertical studs 61 and 62, while holding the enlargement and speeder rod extension against rotation. The enlargement 57 has an upwardly presenting shoulder 63 engaged by the lower end of the spring 64. The spring 64 surrounds the speeder rod extension 56 and at its upper end engages the shoulder 55.

The enlargement 57 is the hub of a spider comprising a plurality of spring arms, illustratively four, namely 65, 66, 67, and 68, having free ends juxtaposed to the actuating stud of a plurality of micro-switches, or the like, as 70, 71, 72 and 73, mounted on the top plate 12. The free ends of the spider arms are at different levels so arranged that no switches are engaged, at the lower portion of the speeder rod stroke, indicated in the section of Fig. 1. The switches, or any of them, may have any desired circuit-controlling "off" position. As the switches may have double poles, the controlled circuits may illustratively be closed or open in the disengaged switch position. With all switches disengaged at the position of static rest of the fly weight and speeder rod, the switches are successively engaged, actuated, and held as the speeder rod moves upwardly, and are successively disengaged as the speeder rod moves downwardly from the extreme upper position, or proportionally from any intermediate level to which it has attained.

It is pointed out that with the arrangement of fly weights and fly arms disclosed the governor is in both dynamic and static balance and also is generally immune to accelerative forces incident axially of the governor or in any plane diametrical of the axis of the governor. This is because any acceleration tending to depress one ball or fly weight, for instance, is neutralized by the fact that the same force tends to depress the other ball on the opposite side of the horizontal pivot 42. This is in marked contrast to ordinary governor organizations using fly weights on bell crank ball arms having separate pivots in which ball arm toes engage, and both exert force in the same direction on the speeder rod, and in which an accelerative force on one ball axial of the rotative axis is augmented in movement by the same force on the other ball in the same direction.

In operation the shaft 17 is turned by the rotation source and centrifugal force on the fly weights begins to exert components lowering fly weight 41 as fly weight 40 raises. The motion of the fly weights in responding to the centrifugal force, of course, moves their integral common ball arms 36 and 37 about the pivot 42, accompanied by upward movement of bell crank segment 30 and rotation about its pivot 31. As the gear segment 35 is pulled upwardly in an arcuate path about the ball arm axis 42, it turns on its pivot 31, through reaction from the teeth of the internal rack 34, and raises the free arm 32, and thus, through pivot 33, the speeder rod 22. It will be seen that the operation of the speeder rod is functional with the speed of rotation of the shaft 17, and that there will be a normal fly weight and ball arm attitude for each respective speed of the shaft 17.

When it is desired to effect a predetermined change in the attitude of the speeder rod, without affecting or changing the speed of the shaft 17, by the suitable actuations of switches or the like, voltage from a given source (not shown) is switched into the coil or coils 46. The magnetic field thus created acts on the fly weight assembly as described and magnetically changes the attitude of the fly weight organization.

The depressing control effect thus created, or the elevating or depressing control effect created when the fly weight and arm organization constitute a permanent magnet, is enhanced, zonally, according to the proximity to or remoteness thereof from the flux influence of the magnetic plates 10 and 12 and the contours of the latter. This enables the applied voltage to have a different affect at different rotational speeds. The basic consideration is that the speeder rod is lowered or raised as has been explained from the position attained at the instantaneous speed of rotation of the shaft 17, by the application of voltage to the coil.

The lines of force, i. e. the flux field, has components generally axial of the coil, varying in intensity with the impressed voltage, which react upon the magnetic fly weight and arm organization to try to straighten it up in the coil and thus to depress the speeder rod, while the rotational speed remains constant and without added friction on the parts. As noted, with permanent magnetization the speeder rod can be caused to raise or to lower according to the polarity of the voltage on the coil or coils, as will be clear.

It will be seen that the basic principles of the invention can be utilized to advantage in other forms of the governor, and reference is made to Figs. 4 and 5 for purely illustrative modifications.

Referring to Fig. 4, a base plate 80 is provided, mounting a sleeve 81 forming with an intermediate header or transverse plate 82 a fly weight chamber 83, and with end closure 84 a switch chamber 85. A hollow shaft 86 is provided having a reduced shank 87 journalled in the bottom plate 80. By an upper bushing member 88 shaft 86 is journalled in the header or upper plate 82. Hollow shaft 86 contains a guided block 87 forming the lower extremity of the speeder rod 90 journalled in the bushing 88, and movable axially in response to positionings of the fly weights, as will be described. The hollow shaft 86 is longitudinally slotted, as at 91, through which slot, a pivoted link 92 extends and works between fly weight arms 36 and 37 mounting the fly weights 40 and 51, and enlargement or block 87.

In the fly weight chamber 83 the fly weights 40 and 41, mounted on spaced ball arms 36 and 37 (of which, in Fig. 5 section, only one is shown) move about the common fly weight pivot 42, on which the arms 36 and 37 are pivoted to the hollow shaft 86. The link 92 is pivoted at its inner end at 100, to the block 87, and the outer free end thereof, on the opposite side of said slot 91, is pivoted, at 101, to the ball arms 36 and 37, whereby ball arm movement, in response to displacement of the fly weights, will exert tension on the link 92, and elevate the block 87, to elevate the speeder rod 90, against speeder spring 89.

The fly weight chamber 83, usually externally of the sleeve or housing 81, is surrounded by a pair of concentric independent coils, respectively 103 and 104, of which coil 103 has leads 103a and 103b. Coil 104 has leads 104a and 104b.

In the switch chamber 85 a plurality of switches are disposed, which may comprise micro-switches or the like having plural poles. The end closure 84 has an axial central boss apertured as at 105 in a threaded aperture, within which the tubular guide member 106 is threaded, and held in an adjusted position by means of a lock nut 107. A switch rod 108 has an upper end slidable in the tubular guide member 106, against the resistance of a spring 110, compressed against the inner end of the tubular member 106, and the end of the switch rod 108. The switch rod mounts a plurality of flanges, illustratively flanges 111 and 112, and the latter comprises the upper surface of a bearing enlargement 113 mounting a bearing 114 in which the upper end of the speeder rod 90 is journalled.

The switches in the switch chamber are respectively switch 120, having normally made contacts, controlled by an arm 121 in position to be engaged by the switch-operating flange 112, as the first switch operated by the rising speeder rod, and movable from the normally made position to make the normally open or unmade contacts of the switch. Disposed axially of the speeder rod above the arm 121 is the arm 124 of switch 125, as the second member engaged by flange 112 in the rise of the speeder rod, and thus of the switch rod, to move the contacts from the normally made contact toward and to close the normally open or unmade contacts thereof. Arm 124 is axially above the lever of the arm 121. Similarly the normally closed switch 126 has an arm 127 juxtaposed to the flange 111 in position to be actuated by this flange after the lower flange has actuated both of the preceding switches, and to move from the normally closed contact relation to the normally unmade or open contacts thereof. Finally, the switch 128 has actuating arm 130 as the member ultimately actuated by flange 111.

It will be seen that energization of the respective coils individually, differentially, oppositely or in whatever combinations desired will effect the desired impressed control effect on the position of the fly weights to secure a functionally related displacement thereof relative to the normal attitude or position for a given rotational speed, in the same manner as has been described of the earlier figures.

It will be understood that under certain conditions of use such as in automotive vehicles and the like, the organizations described may be subjected to impacts or shocks manifested as accelerations in one sense or the other generally axially of the speeder rod, and although the fly weight organization will neutralize the effects to a certain degree as far as the fly weight organization is concerned, the speeder rod and related assembly represent mass which may respond to such accelerative forces. It is desired to avoid even this small response to accelerations in certain cases, for which purpose some such organization as is shown in Fig. 5 may be used.

In Fig. 5 the organization, as an illustrative embodiment of this phase of the invention, may be substantially identical with the disclosure of Fig. 4, although, of course, equally applicable to the earlier figures. To this end, the shaft organization, the fly weight organization, the solenoid coil organization, and the switch organization are the same and bear the same reference characters. The major difference lies in the provision of a link 140, pivoted to the arms 36—37 and to a counterbalance weight 151, on the opposite side of pivot 42 from the link 92. The mass or counterweight 141 may be slidable in hollow shaft 13, for which purpose the shaft may, if desired, have a larger internal diameter than shown, or may comprise a weighted ring surrounding the shaft 13, as shown. In any case, it will be seen that with careful calibration of the weights any accelerative forces effective in one direction on the axially movable mass of the governor will be neutralized and cancelled by the opposing force developed on the counterweight by the same accelerative force.

The simplicity and efficiency of the invention will be evident, as will the fact that various modifications may be resorted to without departing from the spirit of the invention, and as recited in the appended claims.

Having thus described my invention, I claim:

1. A governor comprising a rotatable element, fly weights pivoted on the rotatable element, a speeder rod operatively associated with the fly weights for axial movement, a speeder spring urging the speeder rod and fly weights toward a static rest position from which they move as a function of rotative speed of said element, means for exposing said fly weights to electro magnetic influence, and said fly-weight being of material and constitution to respond electro-magnetically to such exposure to change the function of response to rotative speed.

2. A governor as recited in claim 1, in which the means comprises a coil substantially surrounding the fly weights.

3. A governor comprising a rotatable element, arm means pivoted substantially medially on said rotatable element, fly weights mounted on said arm means on opposite sides of said pivot, an axially slidable speeder rod, connections between said arm means and the speeder rod for effecting axial movement of said speeder rod functional with tilting of said arm means in response to centrifugal force incident to rotation of said element, a speeder spring operative to resist speeder rod movement and to urge said arm means toward a static rest position, a generally cylindrical electrical coil surrounding the fly weights and polarized during energization, said fly weights and arm being so constituted and arranged that at least during energization of the coil the weights and arm are polarized to effect a reaction of the fly weights and arm means and the coil to modify the instantaneous attitude of the arm means and fly weights and thus of the speeder rod.

4. A governor as recited in claim 3 in which the arm means and fly weight constitutes a permanent magnet whereby the sense of modification of the instantaneous attitude of the arm means and fly weights and thus of the speeder rod is related to the sense of energization of said coil.

5. A governor comprising a rotatable shaft containing an axial chamber, a slot formed in the shaft extending axially thereof and into said chamber, a pair of arms, fly weights connecting the free ends of the arms and forming together a fly weight organization, means pivoting the organization to said shaft on a main axis transverse of a diametrical plane axial of said shaft passing through said slot and said chamber, a speeder rod concentric with and slidable in said shaft with its axis lying substantially in such diametrical plane, an internally toothed arcuate rack mounted on said shaft substantially symmetrical with such plane and having an axis of generation substantially coincident with said main axis, a segmental gear bell crank lever extending through said slot and pivoted to said speeder rod on a pivot bisected by the speeder rod axis, means pivoting the lever to the arms on a lever axis in radial spacing from said main pivot whereby said lever axis moves with the arms concentric with the rack, said segmental gear bell crank being in mesh with said rack whereby with tilting movement of said organization the pivot of said lever and speeder rod moves linearly axially of said shaft to move the speeder rod axially, and a speeder spring exerting bias on said speeder rod to urge it and the organization toward a static rest position.

6. A governor as recited in claim 5 in which the said organization is of magnetic material, and a coil is provided surrounding the organization so that when the coil is energized the organization rotates with the shaft in an electro magnetic field to modify the organization and speeder rod attitude for a given shaft rotational speed when the coil is energized.

7. A governor as recited in claim 5 in which the said organization is of magnetic material and is surrounded with an electrical coil to subject the organization to an electrical field during rotation, and a transverse header element spaced axially of the shaft on one side of the said organization and of magnetic material disposed in said electrical field.

8. A governor as recited in claim 5 in which the organization is of magnetic material and is surrounded by an electrical coil to subject the organization to an electrical field during rotation, and opposing header elements of magnetic material spaced on opposite sides of said organization axially of the shaft and disposed for magnetic reaction to the electrical field of said coil.

References Cited in the file of this patent

UNITED STATES PATENTS

| | | |
|---|---|---|
| 148,913 | Andrade | Mar. 24, 1874 |
| 267,446 | Mott | Nov. 14, 1882 |
| 742,842 | Dodge | Nov. 3, 1903 |
| 1,093,852 | Hendrickson | Apr. 21, 1914 |
| 1,145,232 | Dean | July 6, 1915 |
| 2,229,058 | Dicks | Jan. 21, 1941 |